Figures 1A, 2:
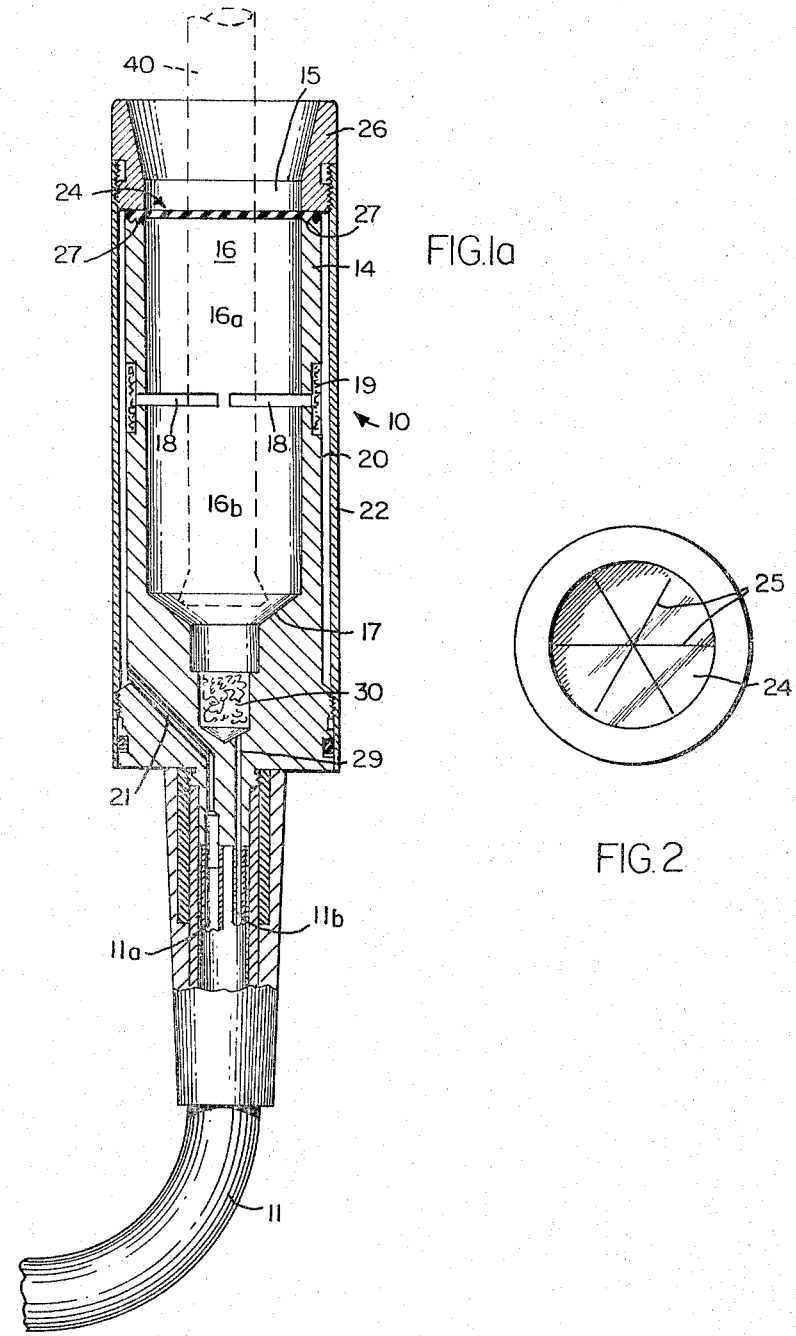

INVENTOR
JOHN A. ROBERTS

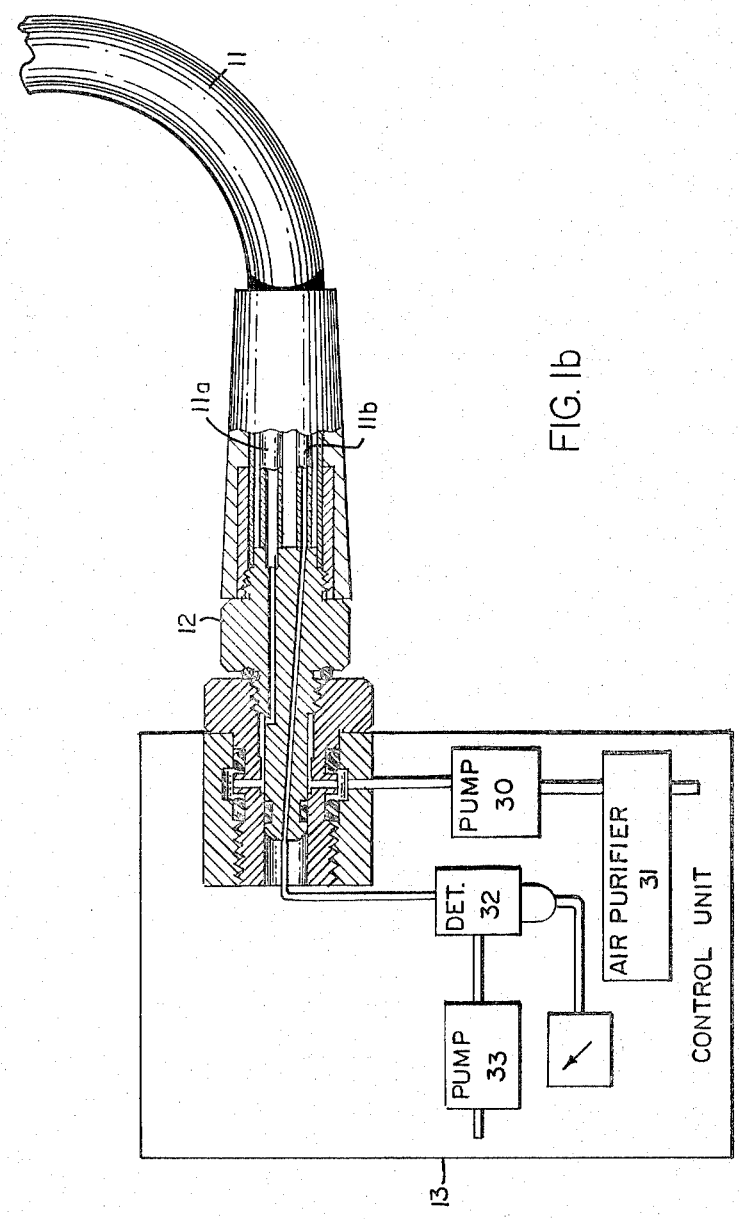

United States Patent Office 3,302,449
Patented Feb. 7, 1967

3,302,449
LEAK DETECTOR
John A. Roberts, Lynnfield Center, Mass., assignor to General Electric Company, a corporation of New York
Filed Oct. 2, 1964, Ser. No. 401,031
12 Claims. (Cl. 73—40.7)

This invention relates to leak detectors and more particularly to leak detecting systems utilizing a portable probe for detecting leaks in a contaminated environment.

Leak detectors are commonly utilized in factories to test the air-tight integrity of sealed units as they come off the production line. As an integral part of such a test, the sealed units are pressurized with a tracer gas and then they are probed to locate any leaks. This necessitates the repeated connection and disconnection of the tracer gas source from the units as they pass on the production line and results in the repeated escape of some of the tracer gas into the test area, thus causing a buildup of the tracer gas in this area. The resulting contamination interferes with the effective operation of conventional prior art leak detectors in the absence of a pure air booth or room since the contamination in the area would normally be many times larger than the concentration attributable to the size leak which is to be detected.

This problem is commonly present in the refrigerator manufacturing industry wherein connections to the unit being charged with tracer gas are established through metallic tubing. After the unit has received its charge of refrigerant, which normally comprises a halogen tracer gas, the tube is pinched off to prevent the gas from escaping while the end of the tube is disconnected from the source of refrigerant and then sealed. Normally, the unit is disconnected by physically cutting the tubing, which is then pinched off and soldered.

The integrity of this seal must then be checked in this environment to determine whether the seal is adequate. A common standard utilized in the refrigeration industry calls for the rejection of any leaks larger than $3 \times 10^{-6}$ cc. per second. It is also quite conventional in this industry to find concentrations in proximity to the leak test station 100 to 1000 times higher than this concentration. This problem is especially vexing since this background contamination is never constant but varies widely, thus preventing effective leak detection in such an environment with prior art devices. Heretofore, costly pure air booths or rooms have had to be utilized to perform such tests.

It is therefore an object of this invention to provide a new and improved leak detector for use in highly contaminated areas.

It is another object of this invention to provide a new and improved system for detecting leaks in highly contaminated environments without requiring a pure air room to enclose the unit under test.

Further objects and advantages of the invention will become apparent as the following description proceeds, and the features of novelty which characterize the invention will be pointed out with particularity in the claims annexed to and forming a part of this specification.

In accordance with the invention, a leak detector is provided for detecting leaks in a contaminated environment by providing a probe having its own internal pure air flow so that the portions of the unit under test that are most likely to have leaks are tested by placing the probe over such portions where they are tested in the pure air environment within the probe. This has been found to be considerably faster and less costly than providing pure air booths or rooms large enough to encompass the entire unit under test. The pure air environment within the portable probe is made possible in accordance with my invention by providing two barriers which prevent the entry of contaminated air. The first of these barriers is in the form of a resilient member for closing off the mouth of the chamber formed in the probe while the second barrier is formed by a pure air curtain located at an intermediate point in the chamber and transverse thereto. These barriers have been found to be effective to exclude background tracer gas contamination from the chamber of the probe under all conditions of operation.

For a better understanding of this invention, reference may be had to the accompanying drawings, in which:

FIGURES 1A and 1B contain a schematic showing of the leak detector of my invention with some of the components thereof partially in section; and FIGURE 2 is an end view of the probe of the detector of my invention.

Referring now to FIGURES 1A and 1B, the leak detector of my invention is illustrated as comprising a portable probe 10, flexible line 11, coupling device 12, and leak detector control unit 13. Probe 10 is illustrated as comprising a cylindrical element 14 having a hollowed-out portion forming chamber 16 which is defined between open mouth 15 and the bottom 17 of the chamber. Slots 18 intermediate open end 15 and bottom 17 are provided to admit pure air to chamber 16. Air entering slots 18 from annular chamber 20 is diffused by diffuser 19 which covers these slots, causing a uniform radial flow from the slots to provide a transverse curtain of pure air across chamber 16. This curtain of pure air effectively divides chamber 16 into two parts, i.e., chamber 16a and 16b. Chamber 20 is, in turn, coupled through passageway 21 to flexible conduit 11a of line 11. Reference to FIGURE 1A will indicate that annular chamber 20 is formed between the interior surface of sleeve 22 and the exterior surface of probe element 14.

Means is provided by resilient diaphragm 24 for substantially closing off the open end 15 of chamber 16 so as to inhibit the passage of contaminated air and dust into chamber 16, thus providing a second curtain or barrier between the contaminated atmosphere and chamber part 16b.

Referring now to FIGURE 2, it may be seen that resilient diaphragm 24 has a plurality of radial slits 25 which permit the entry of the portion of the unit under test. Diaphragm 24, which is preferably formed of heat-resistant silicone rubber is secured across open mouth 15 by being clamped between surface 27 of element 14 and member 26, which is threaded so as to be received in the open end of sleeve 22.

Passageway 29, which is coupled to flexible conduit 11b, comprises means for drawing samples of air from chamber 16b. Passageway 29 is also coupled to chamber 16b through inlet filter 30, which is provided to prevent the entry of dust or other foreign bodies into passageway 29, line 11, and thus control unit 13.

Referring now to FIGURE 1B, pump 30 and air purifier 31 of control unit 13 serve as a source of pure air which is coupled to pure air conduit 11a through coupling device 12. Coupling device 12 also serves to couple pump 33 and detector 32 to sampling conduit 11b. As is well known in the art when utilizing halogen tracer gases, detector 32 will provide a signal which, when applied to instrument 34, will indicate the concentration of halogen in the sample being drawn through the detector by pump 33.

The operation of the leak detector of the invention will now be described during both its "stand-by" and its "leak detection" modes of operation. Control unit 13 is fully energized with both pumps operating when in "stand-by," and resilient diaphragm 24 is in the position illustrated in FIGURE 1A, thus substantially closing off the open end of part 16a of chamber 16. Pump 33 will continuously draw air samples through detector 32 from part 16b of chamber 16 at a rate determined by the requirements of detector element 32. For example, a rate of 4 cc. per second has been found to provide satisfactory detector element operation. Pump 30, on the other hand, is continously pumping purified air into annular chamber 20 through conduit 11a and passageway 21. This purified air is then diffused by diffuser 19 as it enters slots 18 so as to provide a uniform radially inward flow of pure air to create the desired transverse curtain of pure air across chamber 16.

In accordance with my invention, pump 30 will supply purified air to probe 10 at a greater rate than pump 33 is extracting air samples therefrom to prevent the entry of contaminated air into probe 10. For example, it has been found that if pump 30 supplies purified air at the rate of 10 cc. per second, contaminated air is entirely excluded from part 16b of chamber 16 during normal detector operation since the difference between these two flow rates will cause a continuous outward movement of air from the air curtain through part 16a of chamber 16 and diaphragm 24. This continuous flow of air will remove any possible contamination due to the entry of eddies of contaminated air through the slits in diaphragm 24. Thus, part 16b of chamber 16 is continuously maintained in a halogen-free condition when the system is in "stand-by."

The leak detector may be changed to its leak detection mode of operation by merely placing portable probe 10 over the portion of the unit to be tested so that the portion being tested is in the position illustrated in the dotted line at 40 in FIGURE 1A. This results in forcing aside the center of diaphragm 24. However, due to its resilient nature, substantially only the center portion is bent back, leaving the rest of the diaphragm undisturbed. Thus, the slits between the substantially undisturbed portions of the diaphragm do not open to a significant extent. This maintains the effectiveness of the barrier created by diaphragm 24 even during this mode of operation. Thus, any leaks emanating from the unit within part 16b of chamber 16 will be drawn through filter 30 into passageway 29 and thus be measured in control unit 13 without being affected by external contamination.

It may thus be seen that in accordance with my invention, an inexpensive, yet highly accurate system is provided for detecting leaks in highly contaminated areas which is extremely simple to operate and also dispenses with expensive pure air facilities previously required.

Therefore, while a particular embodiment of the subject invention has been shown and described herein, this is in the nature of description rather than limitation, and it will occur to those skilled in the art that various changes, modifications, and combinations may be made within the province of the appended claims without departing, either in spirit or scope, from this invention in its broader aspects.

What I claim as new and desire to secure by Letters Patent of the United States is:

1. A system for detecting in a contaminated environment leaks of a tracer gas emanating from a portion of a unit containing said tracer gas comprising a portable probe element forming an open-ended chamber for receiving said portion of the unit,
   means intermediate the open end and the bottom of said chamber for providing a radially inward flow of pure air to create a transverse curtain of pure air across said chamber to thereby divide said chamber into first and second parts, said second part being between said curtain and said bottom, and
   means for drawing samples of air from said second part of said chamber and detecting the tracer gas content thereof, said detecting means drawing air from said second part of the chamber at a rate which is less than the rate at which pure air is being added to the chamber whereby the excess is exhausted through said first part to the atmosphere thereby preventing contaminated air of said atmosphere from reaching said second part of the chamber.

2. The combination of claim 1 further comprising means for substantially closing off the open end of said chamber to inhibit the passage of contaminated air and dust into said chamber when the system is on stand-by, said closing means being resilient so as to be deflectable to admit the portion being tested into said chamber.

3. The combination of claim 2 in which said resilient closing means comprises a resilient disk secured across said open end, said disk being slit in a radial direction from its center, the length of the slits being great enough to permit entry of said portion of the unit.

4. A system for detecting in a contaminated environment tracer gas leaks emanating from a portion of a unit containing said tracer gas comprising a portable probe element forming an open-ended chamber for receiving said portion, said chamber having openings therein lying in a plane normal to the longitudinal axis of the chamber intermediate the open end and the bottom,
   means for providing in said plane a substantially planar, radially inward flow of pure air from said openings to create a transverse curtain of pure air across said chamber and to thereby divide said chamber into first and second parts, said first part being between said pure air curtain and said open end, said second part being between said pure air curtain and said bottom, and
   means for drawing samples of air from said second part of said chamber and detecting the tracer gas content thereof, said detecting means drawing air from said second part of the chamber at a rate which is less than the rate at which pure air is being added to the chamber whereby the excess is exhausted through said first part to the atmosphere, thereby preventing contaminated air of said atmosphere from reaching said second part of the chamber.

5. The combination of claim 4 in which said openings comprise slits lying in said plane, said combination further comprising means coupled to each of said slits for diffusing the pure air passing therethrough to thereby make said planar air flow uniform.

6. The combination of claim 5 in which said means for providing said planar flow of pure air comprises a source of pure air and flexible means for connecting said source of pure air to the input of said diffusing means.

7. The combination of claim 6 in which said connecting means comprises means spaced from the exterior surface of said probe element to define an annular chamber, said annular chamber being coupled to the input of said diffusing means.

8. The combination of claim 7 in which said connecting means further comprises a flexible conduit for coupling said annular chamber to said pure air source.

9. The combination of claim 8 in which said means for sampling and detecting comprises an opening in the bottom of said chamber, means for filtering air entering said opening from said chamber, a tracer gas pumping and detecting circuit and a second flexible conduit for coupling the input of said unit to said opening via said filter.

10. The combination of claim 9 in which said pure air source and said tracer gas pumping and detecting unit are located at the same location, said conduits being incorporated into a common flexible line leading from said location to said portable probe element.

11. The combination of claim 10 further comprising means for substantially closing off the open end of said chamber to inhibit the passage of contaminated air and dust into said chamber when the system is on stand-by, said closing means being resilient so as to be deflectable to admit the portion being tested into said chamber.

12. The combination of claim 11 in which said resilient closing means comprises a resilient disk secured across said open end, said disk being slit in a radial direction from its center, the length of the slits being great enough to permit entry of said portion of the unit.

References Cited by the Examiner
UNITED STATES PATENTS
2,819,609  1/1958  Liebhafsky _____ 73—40.7
2,996,661  8/1961  Roberts _____ 73—40.7 XR LOUIS R. PRINCE, *Primary Examiner.*

JEFFREY NOLTON, *Assistant Examiner.*